(12) United States Patent
Quist et al.

(10) Patent No.: US 10,612,228 B2
(45) Date of Patent: Apr. 7, 2020

(54) DETECTION AND MONITORING SYSTEM FOR THE MANAGEMENT OF COMBINED SEWER SYSTEMS

(71) Applicant: Hadronex, Inc., Escondido, CA (US)

(72) Inventors: Gregory M. Quist, Escondido, CA (US); David Drake, Escondido, CA (US); David B. Rees, Encinitas, CA (US); Lawrence Brian Merchell, San Marcos, CA (US); John D. Boyd, San Diego, CA (US)

(73) Assignee: HARDONEX, INC., Escondido, CA (US)

( * ) Notice: Subject to any disclaimer, the term of this patent is extended or adjusted under 35 U.S.C. 154(b) by 107 days.

(21) Appl. No.: 15/716,751

(22) Filed: Sep. 27, 2017

(65) Prior Publication Data

US 2018/0087259 A1 Mar. 29, 2018

Related U.S. Application Data

(60) Provisional application No. 62/400,574, filed on Sep. 27, 2016.

(51) Int. Cl.
| | |
|---|---|
| *E03F 5/042* | (2006.01) |
| *E03F 3/02* | (2006.01) |
| *G05D 9/12* | (2006.01) |
| *E03F 5/12* | (2006.01) |
| *G01F 1/32* | (2006.01) |

(52) U.S. Cl.
CPC .............. *E03F 5/042* (2013.01); *E03F 3/02* (2013.01); *E03F 5/12* (2013.01); *E03F 5/125* (2013.01); *G01F 1/3281* (2013.01); *G05D 9/12* (2013.01)

(58) Field of Classification Search
None
See application file for complete search history.

(56) References Cited

U.S. PATENT DOCUMENTS

| | | | | |
|---|---|---|---|---|
| 3,608,723 | A * | 9/1971 | Brown | G01F 23/2921 |
| | | | | 210/114 |
| 2003/0057152 | A1* | 3/2003 | Haridas | C02F 3/282 |
| | | | | 210/603 |
| 2015/0019146 | A1* | 1/2015 | Montestruque | E03F 5/12 |
| | | | | 702/45 |

* cited by examiner

Primary Examiner — Richard C Gurtowski
(74) Attorney, Agent, or Firm — Jonathan A. Kidney; Intelink Law Group PC

(57) ABSTRACT

A combined sewer/enclosure overflow (CSO) sensor system is described for accurate detection and measurement of overflow events. From the combined data, trending information can determine if there is debris accumulation. Rain masks can be used in the trending data to measure overall health. External sensors in combination with the CSO sensors provide predictive information and additional levels of information/data accuracy. The sensor system automatically and remotely monitors CSO locations and provides real-time data regarding start times, stop times, duration, and flow volumes of overflows that occur in these structures and provide regulatory and public notification of these events.

20 Claims, 10 Drawing Sheets

DETECTION AND MONITORING SYSTEM FOR THE MANAGEMENT OF COMBINED SEWER SYSTEMS

CROSS-REFERENCE TO RELATED APPLICATION(S)

This application claims the benefit of U.S. Provisional Patent Application No. 62/400,574, filed Sep. 27, 2017, the contents of which are hereby incorporated by reference in its entirety.

FIELD

This invention is related to underground structures or enclosures. More particularly, this invention is directed to intelligent monitoring of combined overflow system (COS) structures.

BACKGROUND

Combined sewers operate by using a conveyance that allows for common flows of septic sewage and storm water. Under most conditions this flow is treated by a wastewater treatment plant that then discharges to rivers or the ocean, or is reclaimed for reuse. If storm driven, aggressive flows result and this increased volume of water cannot be processed by the treatment plant and therefore must be discharged untreated into the natural environment. Unavoidable contamination of the environment occurs. Current monitoring methods for combined sewer systems are often primitive, poorly designed, or poorly deployed.

In view of the deficiencies of the current methodologies, various systems and methods are described that provide more accurate and comprehensive method(s) for determining the start, end, and volume of sewage discharged to allow better planning and response for combined sewer operations.

SUMMARY

The following presents a simplified summary in order to provide a basic understanding of some aspects of the claimed subject matter. This summary is not an extensive overview, and is not intended to identify key/critical elements or to delineate the scope of the claimed subject matter. Its purpose is to present some concepts in a simplified form as a prelude to the more detailed description that is presented later.

In one aspect of the disclosed embodiments, a combined overflow structure (COS) detection system is provided, comprising: an overflow structure containing a non-overflow side, a weir, and an overflow side; a first sensor positioned over the overflow structure to determine a fluid level of the non-overflow side; a second sensor positioned over the overflow structure to determine a fluid level over a top of a weir; sensor supporting electronics above the overflow structure coupled to the first and second sensors; a wireless transmitter coupled to the sensor supporting electronics; and an antenna coupled to the wireless transmitter, wherein data from these sensors is wirelessly transmitted to a central data processing system, and the sensor data is used to establish a start and end time of an overflow event and to determine a volume of fluid discharged over the weir.

In another aspect of the disclosed embodiments, the above system is provided, further comprising a third sensor over the overflow structure positioned to determine a fluid level of the overflow side and coupled to the sensor supporting electronics; and/or wherein the overflow structure is in a sewer system; and/or wherein the overflow structure is in a manhole; and/or wherein one or more of the sensors are either ultrasonic, radar, capacitive, optical, standoff water level, immersed water level, weir trigger level, contact, float, moisture, conductivity sensor, magnetic, or micro-electro-mechanical (MEM); and/or where the second sensor is affixed to the top of the weir and comprises a plurality of weir sensor structures disposed across the top of the weir, the plurality providing at least one of level and flow data, and mitigating against data inaccuracy from individual sensor fouling in the weir sensor structures; and/or wherein the weir sensor structure is in an inverted U-shape and contains a liquid or conductive sensor therein; and/or wherein the weir sensor structure contains a MEM sensor with a movable float; and/or within the MEM sensor is attached to the weir sensor structure via a swivel or rotating connector; and/or wherein the central data processing system determines fluid level trending information; and/or where the fluid level trending information is determinative of an obstruction in the overflow structure; and/or further comprising a rain mask over the fluid level trending information to remove rain effects; and/or further comprising one or more environmental sensors external to an enclosure housing the overflow structure, the environmental sensors also forwarding its data to the central data processing system; and/or wherein a sampling rate of the sensors is variable and altered depending on a level detection threshold or an external trigger.

In another aspect of the disclosed embodiments, a method for overflow detection in an overflow structure (COS) is provided, comprising: positioning a first sensor over an overflow structure to determine a fluid level of a non-overflow side of the overflow structure; positioning a second sensor over the overflow structure to determine a fluid level over a top of a weir in the overflow structure; coupling sensor supporting electronics above the overflow structure to the first and second sensors; coupling a wireless transmitter to the sensor supporting electronics; coupling an antenna to the wireless transmitter; transmitting the sensor data to a central data processing system; and establishing a start and end time of an overflow event and determining a volume of fluid discharged over the weir from data received from the sensors.

In yet another aspect of the disclosed embodiments, the above method is provided, further comprising: positioning a third sensor over the overflow structure to determine a fluid level of the overflow side; and coupling the third sensor to the sensor supporting electronics; and/or wherein the overflow structure is in a sewer system; and/or further comprising determining fluid level trending information; and/or further comprising at least one of determining if there is an obstruction in the overflow structure and removing rain effects from the trending information.

In additional aspect of the disclosed embodiments, a combined overflow structure (COS) detection system is provided, comprising: first means for determining a fluid level, positioned over an overflow structure to determine a fluid level of a non-overflow side of the overflow structure; second means for determining the fluid level, positioned over a top of a weir in the overflow structure; supporting electronics above the overflow structure and coupled to the first and second means; wireless transmitting means coupled to supporting electronics; a central data processing system receiving data from the wireless transmitting means; and from the received data, start and end time of an overflow event and determining a volume of fluid discharged over the weir can be determined.

DETAILED DESCRIPTION

Figure 1A:
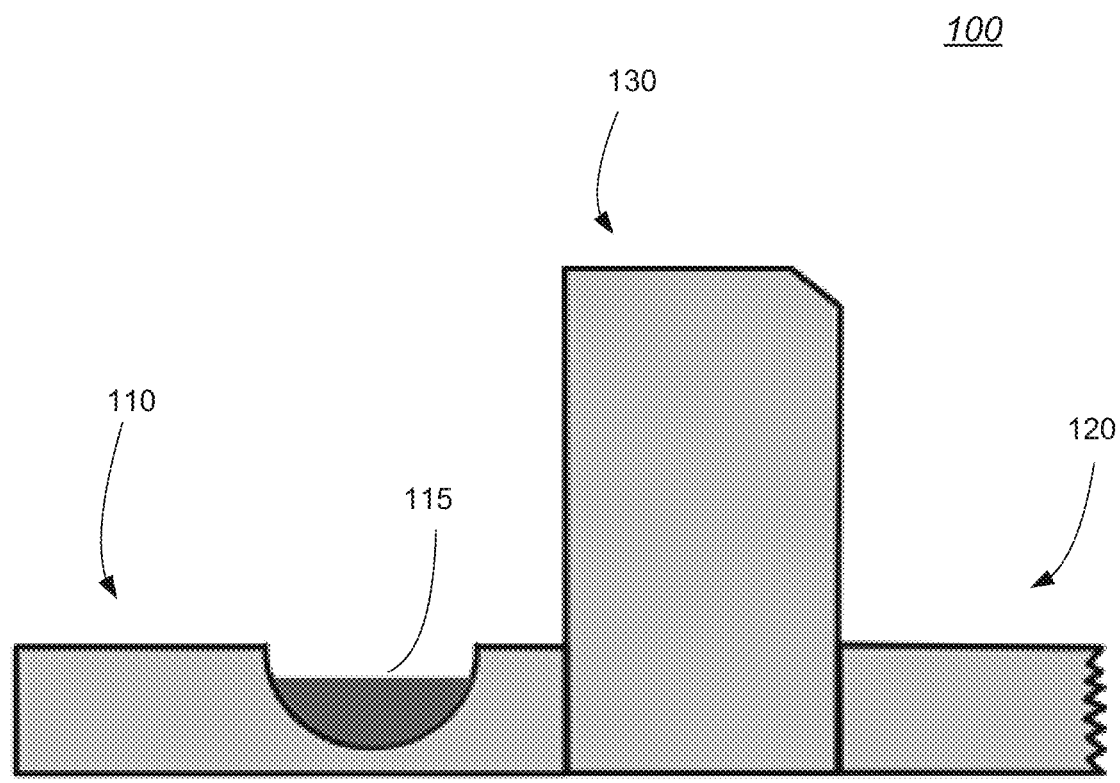
FIG. 1A is a related art illustration showing a conventional combined sewer (CSS) structure.

Most of the volume of sewer overflows in the U.S. comes from combined sewer systems. The Environmental Protection Agency (EPA) says there are about 860 communities in the U.S. with combined sewers. These combined sewers were designed to pass raw sewage from the source to treatment plants under dry weather conditions. However, under stormy conditions rain water and/or snow melt will enter these combined systems via storm drains and, depending upon the intensity of the precipitation, storm water combined with raw sewage will overflow these underground systems and flow directly into the environment. Also, treatment plants at the termination of the combined sewers are typically not large enough to handle the combined load of sewage and storm water.

The Clean Water Act of 1972 prohibits the discharge of sewage into the environment, and since the enactment of this law, local, regional and federal regulators have been acting to compel sewer system operators to "clean up their act" and cease the discharges into the environment. One of the measures of interest to the regulators, and the public in general, is how much sewage has been dumped into the environment, and when the dumping occurred. Until recently, this monitoring has been done by manual and sporadic observation, reported on a nearly random basis by observant citizens. Without an automated means to provide the start times, the stop times, the durations, and the volume of the overflows, the regulators have no visibility into the progress made by regulatory edicts such as consent decrees, the operators get no feedback from their capital and operational improvements, and the public has not idea how severely combined sewer overflows (CSO) are affecting the environment and local waterways.

In view of the above, various systems and methods are described that provide a heightened degree of monitoring as well as accuracy of information in the context of CSO scenarios. For example, various unique means are described to (a) automatically and remotely monitor CSO locations and provide real-time data regarding start times, stop times, duration, and flow volumes of overflows that occur in these structures and provide regulatory and public notification of these events; (b) detect changes on the sewer side of the CSO (versus not on the overflow side) before, during, and after rain events to determine how much material or debris has washed into the sewer system, over the weir (to both gain information on trends associated with debris as a function of rainfall, and also provide maintenance alerts to operators to clean sewers before the next rain event to maximize capacity and also minimize overflows that would be exacerbated by debris; and (c) provide a predictive tool for predicting the response of a combined (or separate) sewer collection system to a particular storm event, enabling mitigation activities and public notification prior to an event, and also provide a prioritized means to plan for capital improvements that could reduce or eliminate overflows under specified conditions. Various illustrations are now provided, describing exemplary embodiments in view of the above.

FIG. 1A is a related art illustration showing a conventional combined overflow structure (COS) 100 located in a sewer, with the dry weather septic sewer side 110, environmental flow side (e.g. ocean, river, lake, etc.) 120 and weir 130. For ease of explanation, the COS structure when located in a sewer will be referred to as a combined sewer structure (CSS), understanding that the concepts described for the sewer embodiment can be replicated to non-sewer implementations (e.g., COS). The septic sewer side 110 may contain a channel with water/sewage/effluent 115. This structure 100 utilizes the height of the weir 130 to prevent flow of the effluent 115 into the environmental flow side 120. It should be appreciated that FIG. 1's configuration is only one of several possible configurations, but is shown here to demonstrate the purpose of the weir 130 as a fixed height barrier. Accordingly, other configurations and or shapes/designs for a CSS system are understood to be within the scope of this disclosure. Also, while side 120 is described as the environmental flow side, it is understood that it is sometimes referred to in literature as the overflow side. Therefore, use of either term may be made without loss of generality.

Figure 1B:
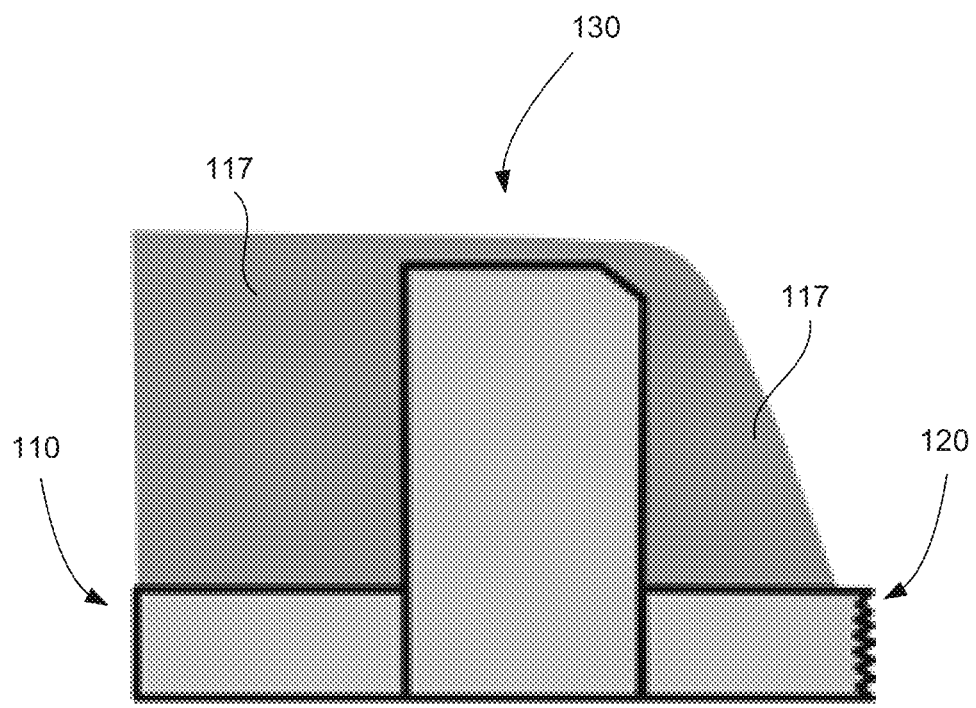
FIG. 1B is a related art illustration showing the CSS of FIG. 1A in an overflow state.

FIG. 1B is a related art illustration 150 showing the CSS 100 of FIG. 1A in an overflow state. If an excess of water/fluid 117 (for example, from a heavy rain storm, or flood, etc.) exceeds the height of the weir 130, it will pass over the weir 130 into the environmental overflow side 120. Of course, if sewage is mixed with the excess fluid 117, then it will be directed to the environment rather than the sewage treatment plant.

Figure 2:
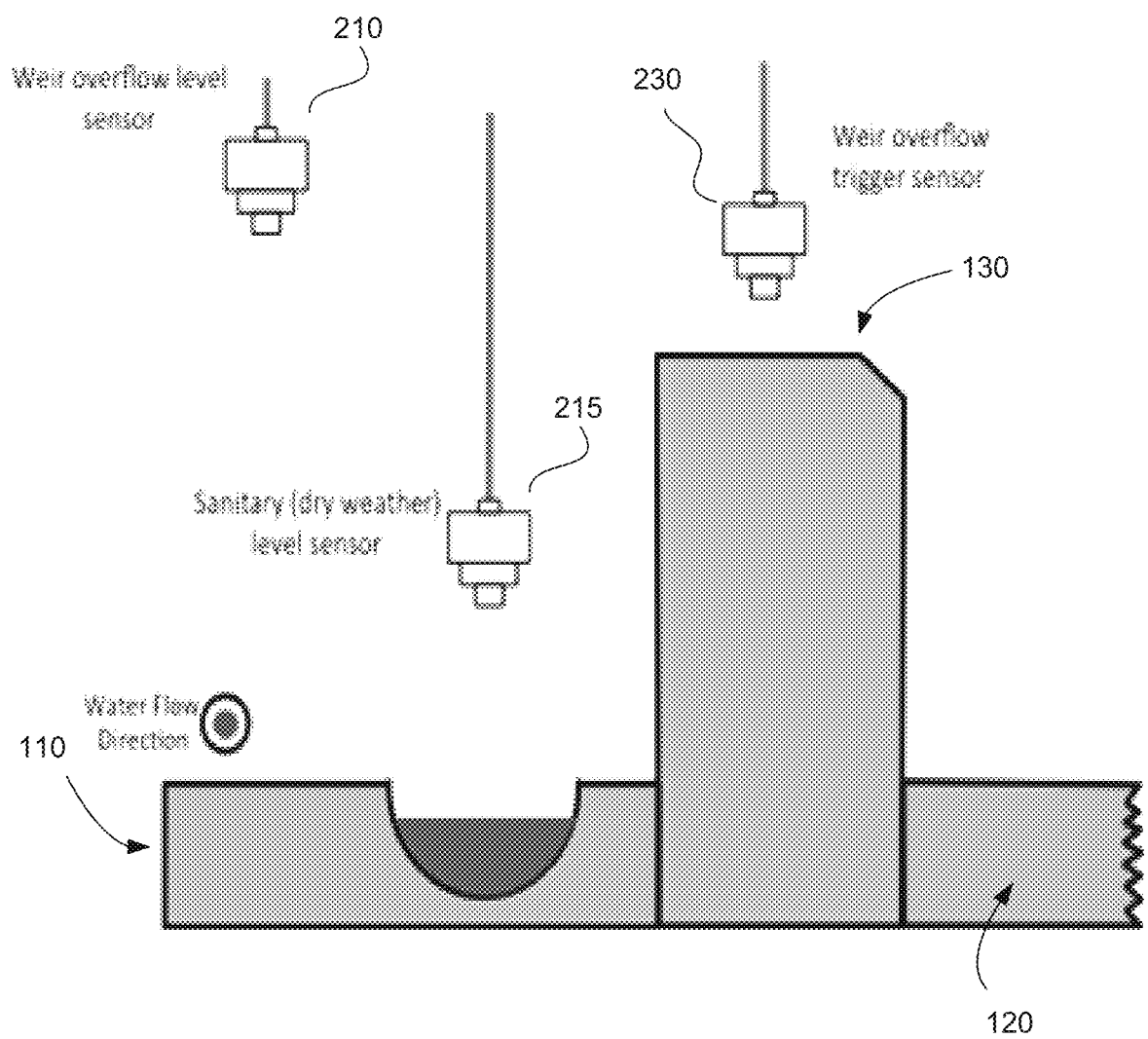
FIG. 2 is an illustration of an exemplary sensor use and/or configuration to monitor and detect overflow conditions.

FIG. 2 is an illustration 200 of an exemplary sensor use and/or configuration to monitor and detect overflow conditions. Here, a plurality of sensors 210, 215, 230 are situated "in-line" with their respective detection zone. The sensors can use any means for level and/or flow detection, non-limiting examples being ultrasonic, radar, capacitive, optical, standoff water level, immersed water level, weir trigger level, contact (e.g., float), moisture, conductivity sensor(s), magnetic, MEMs, etc. Additional optional sensor capabilities can include temperature, humidity, gas, radioactivity, sound, etc.

In addition to the three (3) sensors shown, in some embodiments, it may be desirable to move one of the overflow sensors 210, 230 to above environmental overflow side 120. Alternatively, it may be desirable to add an additional sensor (not shown) to the environmental overflow side 120. In non-trigger operation, one or more of the exemplary sensors could be put into a reduced power mode to prolong battery life.

The combination of the various sensors provides sector-specific information as well as "amount" of overflow, versus the use of a single sensor in the overflow side 120 or on the septic sewer side 110. For example, while sensor 210 can determine that an overflow is occurring, sensor 230 can be used to measure the height of the water going over the weir 130. This would be used to determine the volume of water going over the weir 130, using any one or more of well-known formulas. Under relatively dry conditions sensor 215 can be used to determine either the level or flow of the wastewater for capacity planning and maintenance optimization purposes. Thus, the combination of these sensors provides both dry weather and wet weather information, as well as "precise" amounts of overflow, in contrast to a simple determination that overflow has occurred.

The ability to gauge the amount of overflow is a significant improvement in the industry, enabling planners to better determine modifications to individual sewers or sewer lines in future upgrades and regulators the ability to properly assess the amount of contaminant in the environment, for example. Additionally this information is made available to operators and engineers on a near real time basis, so that status and decisions can be accomplished quickly. Further, this information can be combined with other independent measurements to allow for more complex decisions and determination of cause and effect processes. The rapidity of data recovery also supports more rapid calibration of measurements with field conditions.

Figure 3:
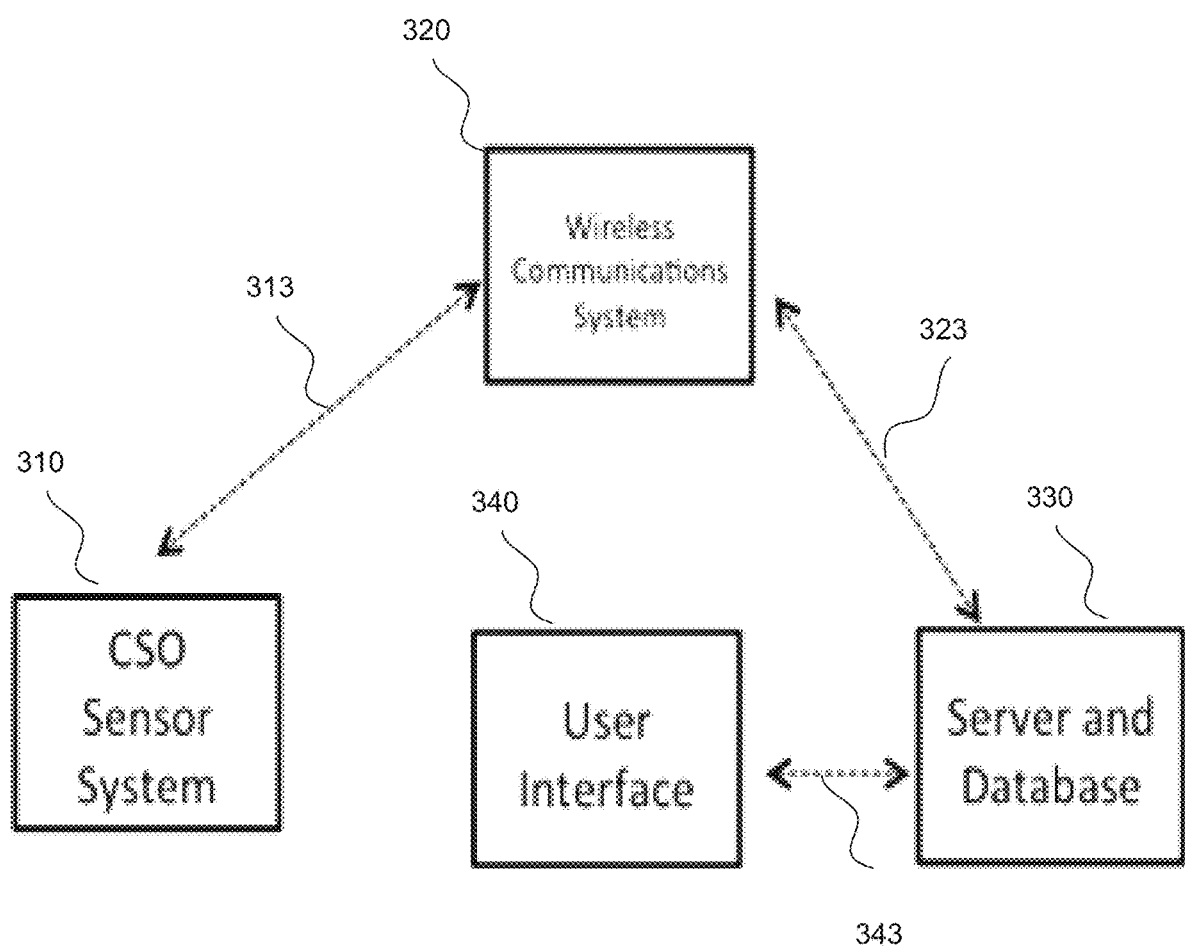
FIG. 3 is block diagram showing connectivity and data communication/management options using the exemplary sensors shown in FIG. 2.

FIG. 3 is block diagram 300 showing connectivity and data communication/management options using the exemplary sensors shown in FIG. 2. For example, the CSO sensor system 310 could send sensor data via link 313 to/from a wireless communication system 320 (either in the CSO sensor system 310 and/or or as a separate system). The wireless communication system 320 would forward via link 323 the sensor data to a server database system 330. The server database system 330 would operate on the sensor data and notify supervisor/user(s) 340 via link 343 any status or alerts, etc. that would be relevant to the information gathered.

As indicated in the links 313, 323, 334, information may be bi-directional and exchanged to and from the various blocks. For example, a CSO sensor system 310 may trigger an overflow alert which would be eventually conveyed to user 340. User 340 may have the option to request the CSO sensor system 310 to reset one or more of its sensors, or poll for a different sensor parameter, etc. Additionally, a public alert, for example in real-time, could be automatically generated from the user 340 or the server database system 330. One or more of links 313, 323, 334 may use an established communication network, e.g., cell phone, satellite, wi-fi, etc.

Figure 4:
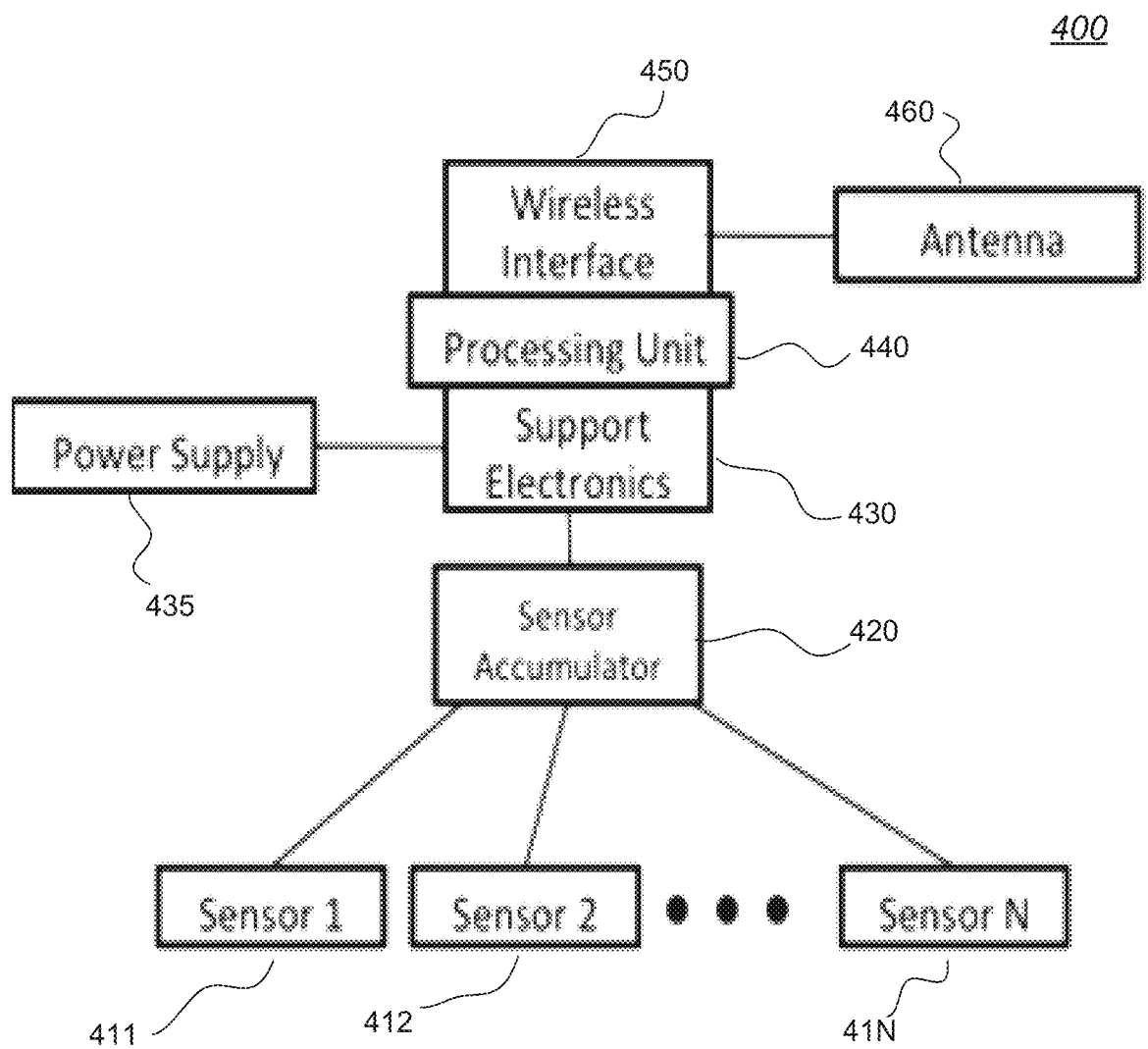
FIG. 4 is an illustration showing various possible hardware components or functionality in an exemplary CSO sensor system.

FIG. 4 is an illustration 400 showing various possible hardware components or functionality in an exemplary CSO sensor system. For an implementation within a sewer system, the components may be supported from a manhole cover, if situated in a manhole. The components are referred to here as "modules" but generally describe a specified function and therefore the "modules" do not necessarily denote a separate device or structure. In some embodiments, it may be desirable to have the modules individually partitioned as shown, however, in other embodiments one or more of the modules (e.g., function) may be shared or performed by a single device, thus reducing the "module" count.

Sensors 410, 411, . . . , 41N represent the set of sensors in a sewer. Sensor accumulator module 420 receives the data from the sensors and forwards to support electronics module 430, which is processed by processing unit module 440, and ultimately wirelessly transmitted from wireless interface (and/or transmitter and/or transceiver) module 450 via antenna 460. Power supply 435 provides power for the various modules and may be a battery. In some embodiments, sensors 410, 411, . . . , 41N may have their own power source, for example, a battery. Power regeneration (solar, kinetic, heat, Seebeck effect, etc.) may be part of the system, according to design preference.

Figure 5A:
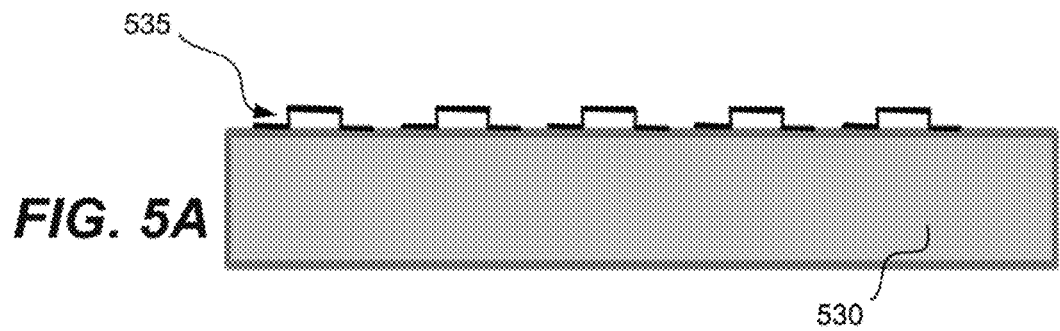
FIG. 5A is a side view illustration of a weir overflow trigger sensor design.
Figure 5B:
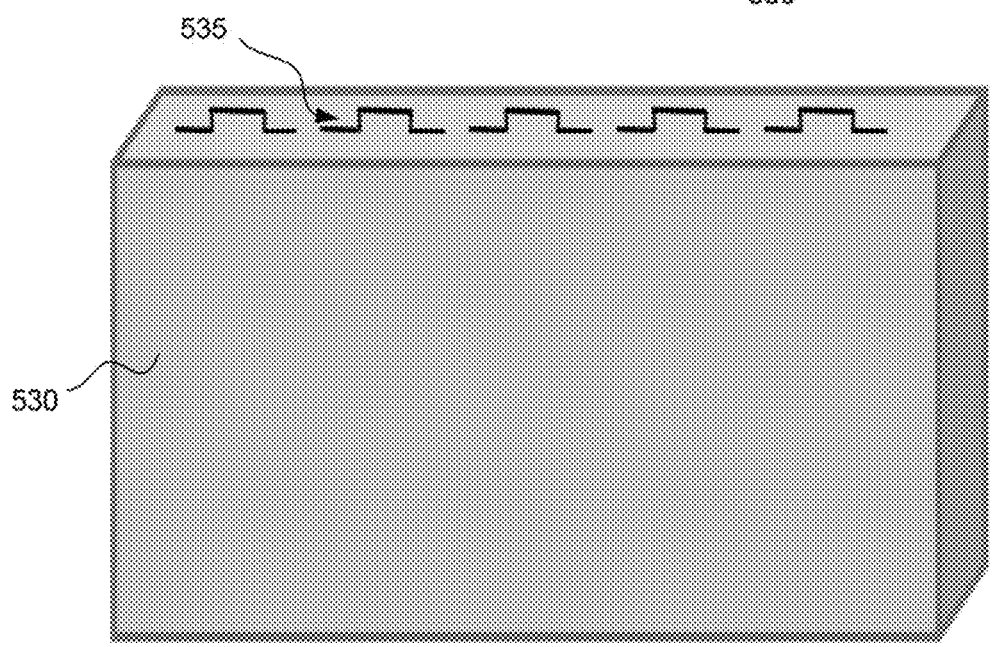
FIG. 5B is a perspective view illustration of a weir overflow trigger sensor design.
Figure 5C:
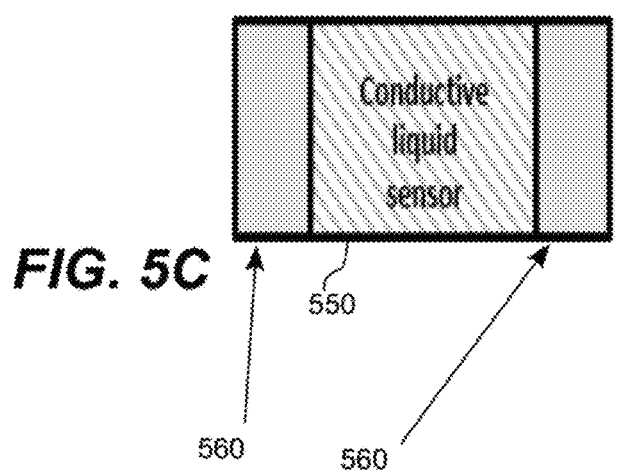
FIG. 5C is a bottom view illustration of a weir overflow trigger sensor design.

FIGS. 5A-C are side, perspective, and bottom view illustrations of a weir overflow trigger sensor design. One or more sensor structures 535 are situated on top of weir 530. The sensor structures 535 could be U-shaped with feet 560 (optimally, secured to the weir top via drilling, weight, screwing, etc.) the sensor element 550 disposed therein. The sensor element 540 may be a conductive sensor, detecting liquid, or some other water/fluid/measurement sensor. Of course, other shapes, for example, T, inverted V, pyramidal, and so forth may be used, the exact shape being dependent on design preference. The height of the sensor structures 535 may be varied, with the sensing element 550 either underneath the top of the sensor structures 535 or actually on top of the sensor structures 535 or even on a side of the sensor structures 535. If the individual heights of the sensing element 550 on the weir 530 top is incrementally staged, different overflow heights can be obtained.

As it is possible for an individual sensor element 550 to be fouled from materials in the water, "group" verification of an overflow condition can be employed. Measurement from either the sewer side sensor (not shown) or overflow sensor (not shown) would assist in determining if all sensor elements 550 are fouled. (E.g., no increase in height on the sewer side or overflow sensor when all sensor elements 550 signal overflow would indicate complete fouling.) All fouled condition could be reported to the maintenance crew.

Not shown in the illustrations but implicit is their respective connection to the sensor accumulator or supporting electronics, seen for example in FIG. 4. In some embodiments, the sensor elements 550 (or sensor structures 535) may be connected to each other, either mechanically (for structural support) or electrically (for sensor data/power sharing).

Figure 6:
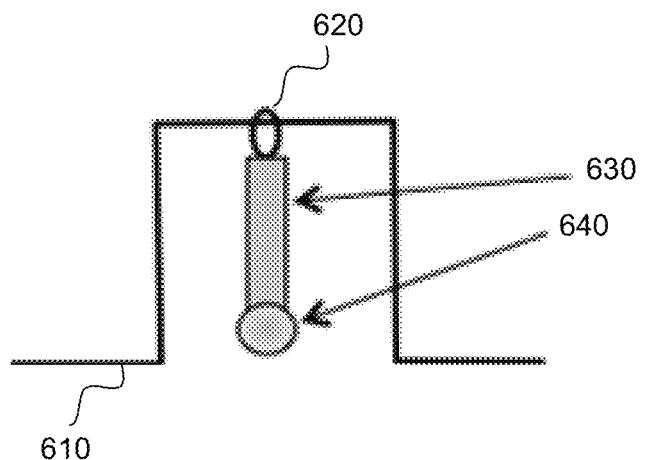
FIG. 6 is an illustration of an exemplary MEM (micro-electro-mechanical) sensor structure for overflow detection.

FIG. 6 is an illustration of an exemplary MEMs (micro-electro-mechanical) sensor structure 600 to determine if there is water flow over the weir (not shown). The MEMs sensor structure 600 comprises a support frame 610, with an optional swiveling/rotating attachment 620 that allows coupled MEMs sensor 630 to rotate, as needed. A float 640 is supplied at the bottom of the MEMs sensor 630 that raises when "water" levels are above the weir, triggering a response from the MEMs sensor 630. The float 640 can also operate to "turn on" the MEMs sensor 630, if so configured, thus reducing power consumption until a trigger event occurs. The actual location and position of the float 640 can be a design choice, therefore, the float 640 may be positioned at a different position than shown. The MEMs sensor 630 may be programmed or calibrated by the supporting electronics (See FIG. 4). A series of these devices could be mounted on the weir. This embodiment could operate in a similar manner to the conductive sensor embodiment described in FIGS. 5A-C.

In some embodiments, the exemplary CSO/overflow sensors and/or system may be self-monitoring in terms of power supply, communications, and sensor performance and can be designed to send a notification of anomalies to an operator (either directly from the CSO system or to an end user/supervisor). Additionally, operation of one or more of the various sensors may be enabled, turned on, turned off, varied depending on weather or power consumption conditions. For example, turn on and/or increased sampling may be triggered if a rain or flood is expected. Or, upon detection of increased fluid levels, an initially slow sample rate may be increased to give more timely updates for increased accuracy.

In addition to overflow detection, the exemplary configuration of sensors allow for debris detection. That is, in a non-rain/flood scenario, a sudden increase of height of the sewer side or overflow side is indicative of debris. Or after a rain/flood, the persistence of increased height will indicate accumulated debris, requiring attention from maintenance operators. These conclusions are not only possible from single event determination by comparing sensors with weather data, but also determinable from trending information from the sensors. That is, "regular" flow can be used as a baseline for trending information with the understanding that "regular" flow will have troughs and peaks, wherein a sustained peak is indicative of debris accumulation in the flow path. Debris accumulation can also be indicated by gradual rise (i.e., trending) of the trough, wherein sediment can be the constituent debris or small bits of debris. Noting such conditions will flag these CSOs as candidates for possible overflow in a rain/flood event, wherein maintenance can be tasked to clean these CSOs prior to the weather event.

Elaborating further, combined sewer systems, because they take in storm water, can collect a large amount of debris during storm events. Without manual inspection of these sites, the amount of debris, silt, etc. accumulating at a particular site is unknown. When the next storm arrives, locations that are meant to flow storm and sewage water to the treatment plant can be blocked and the untreated overflow can easily exceed what would be expected with an unblocked diversion or control structure. Aspects of this approach are detailed in U.S. Pat. No. 9,297,684 and U.S. patent application Ser. No. 14/017,280, by the instant inventors and is incorporated herein for their teachings.

Figure 7:
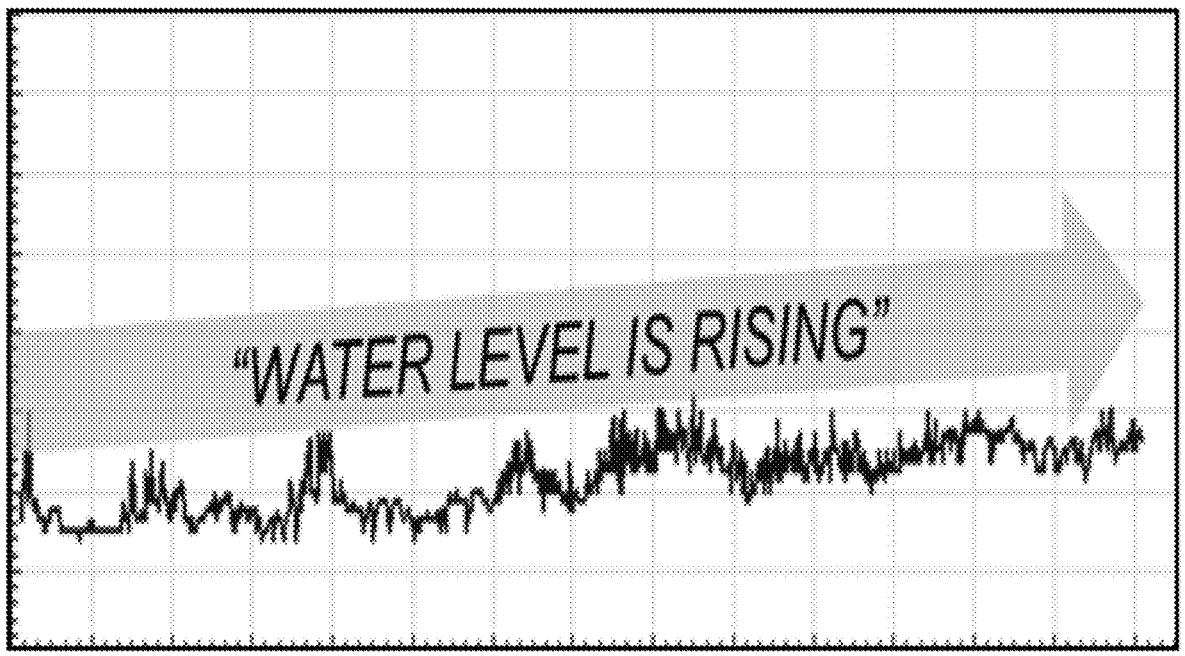
FIG. 7 is a sample plot of sensor water/fluid level heights over time, indicating a trend of rising water level.

FIG. 7 is a sample plot 700 of sensor water/fluid level heights over time, indicating a trend of rising water level (both in troughs and peaks), as revealed from the overall period of time. Water level trends can be measured using fast Fourier transform (FFT) analysis, or least squares fitting of data to a polynomial, or other techniques. Under non-rain conditions, the water level measurements at a CSO structure, by one or both of the sensors that are on the dry/sanitary side of the structure can be used to determine that there is buildup by noting the rise of water levels and inability to retreat back to normal levels.

Figure 8:
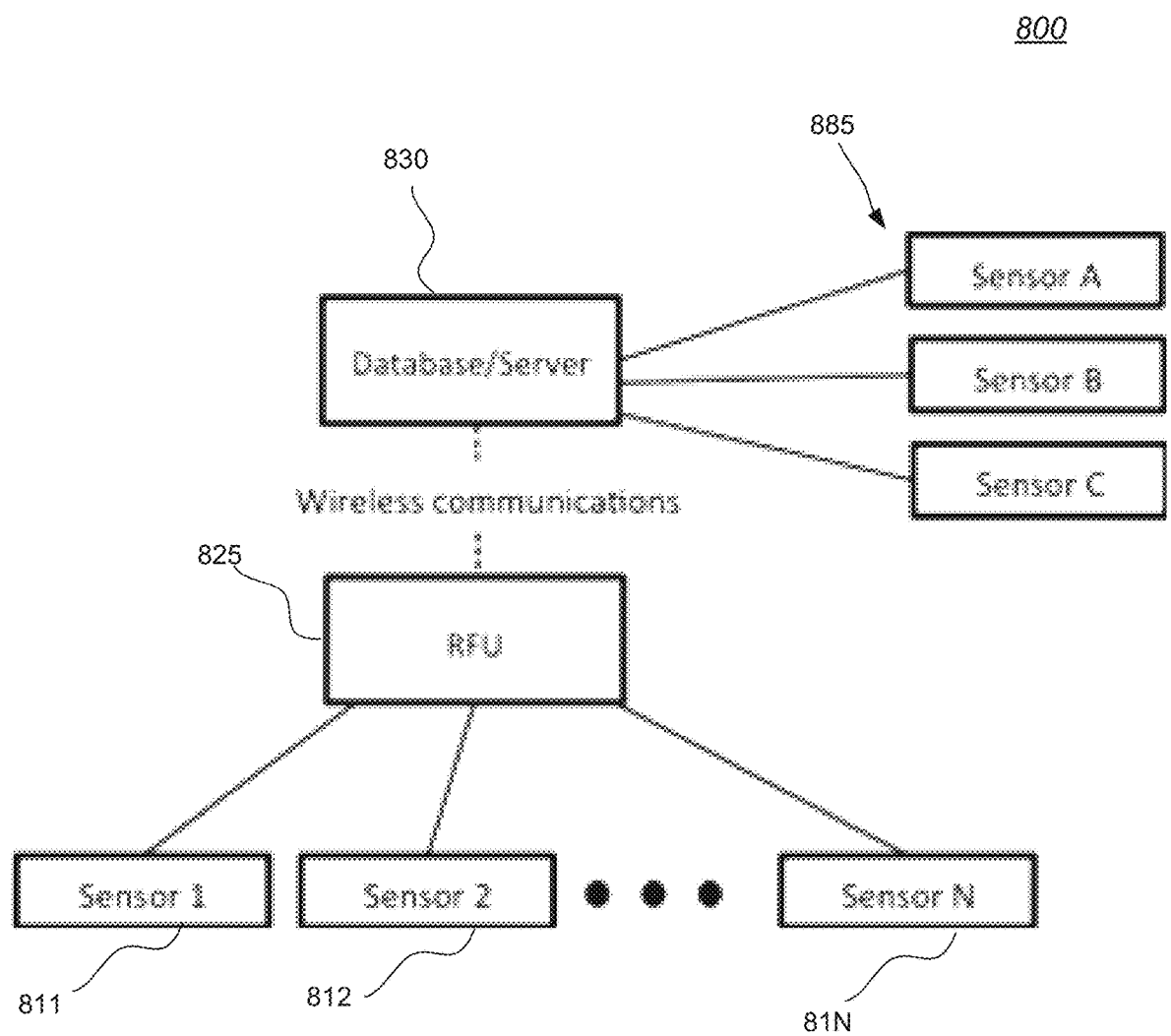
FIG. 8 is a block diagram illustrating another connectivity and data communication/management configuration using multiple sets of sensors, for improved condition assessment.

FIG. 8 is a block diagram 800 illustrating another connectivity and data communication/management configuration using multiple sets of sensors, for improved condition assessment. For example, sensor set 811, 812, . . . , 81N are in communication with a Remote Field Unit (RFU) 825 that is located in a sewer system. The RFU 825 relays the sensor information to a database/server 830, which also is in communication with another set of sensors 885. One or more of sensors 885 may augment the information processed by database/server 830 for increased knowledge and better decision making. For example, sensors 885 may forward geographically relevant environmental information such as snow melt, tides, rain fall, temperature, gas (e.g., $H_2S$, $Cl_2$, CO, $CO_2$, $O_2$, aromatic hydrocarbons, etc.) humidity, wind, etc. These sensors may be "external" to the sewer sensors 811, 812, . . . 81N and would give an extra layer of information for appropriate condition assessment. For example, one or more of sensors 885 may detect hydrocarbons therefore an increase in fluid level from sewer sensors 811, 812, . . . 81N may indicate gasoline or oil entering the sewer weir. Similarly, one or more sensors 885 may be interior to the sewer but not at a weir and therefore, provide similar information—that gasoline/oil is entering the sewer, but not yet at a weir. In extension, run-off from chemical or mineral deposits can be detected, for example run-off from an iron ore deposit may leak into the sewer.

The "external" sensors 885 would enable machine learning or heuristic learning to observe the response of the CSS to various outside influences. Once a response is measured, predictions of the system as a function of outside influences could be made. The ability to predict the effects of an external event on the internal sewer system is invaluable as it provides advance notice to maintenance crews and the managers, so remedial action can be timely initiated or harm can be mitigated.

Figure 9A:
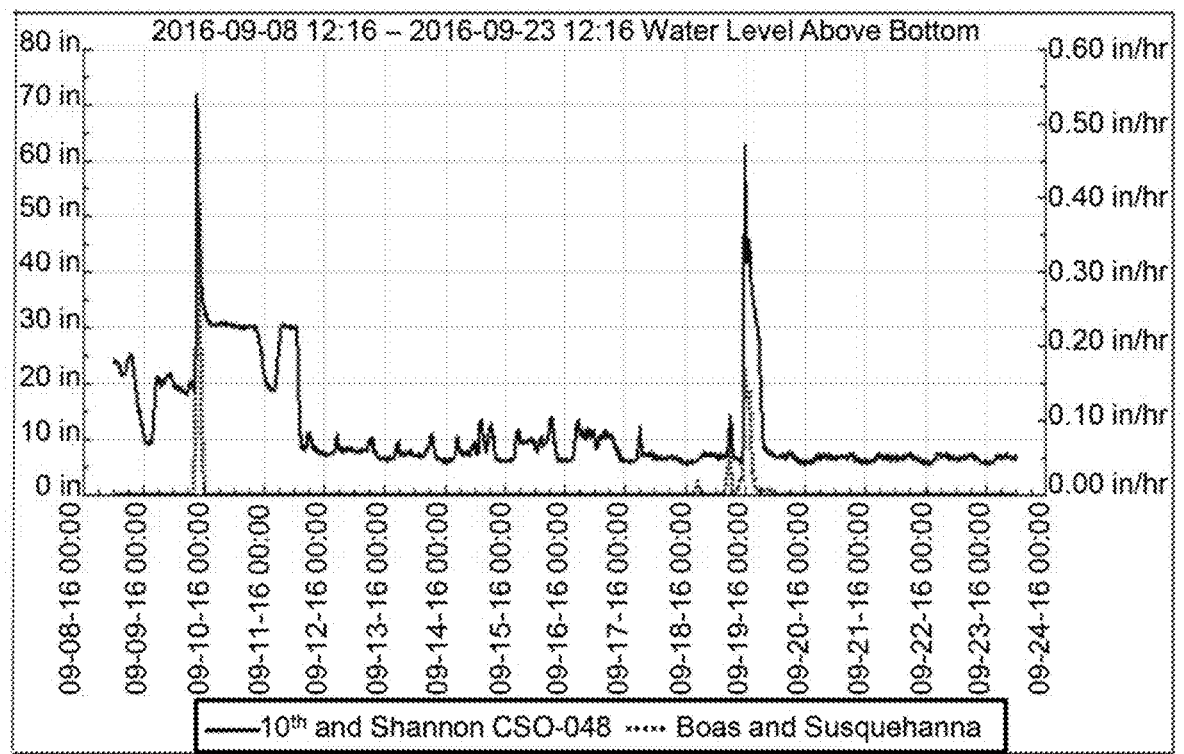
FIG. 9A shows a complete plot with raw rain and level data.
Figure 9B:
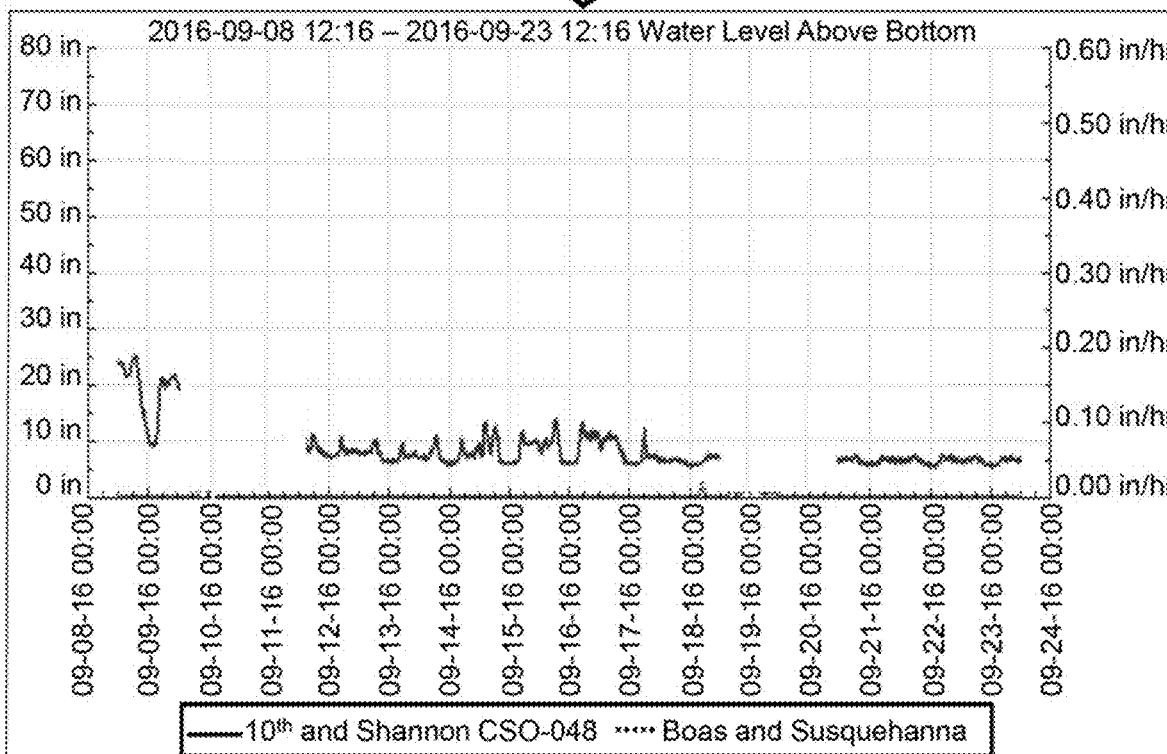
FIG. 9B shows the data of FIG. 9A modified by rain filtering.

FIGS. 9A-B are plots showing trends that can be biased by the response of the CSO structure during and after rain events. FIG. 9A shows a complete plot with raw rain and level data. There are two possible approaches to "normalizing" the rain event data to extract trending data. One approach is to blank out (remove) the level data during and for a fixed time after the rain ceases (or reaches a specified low rate—for example, 4 hours). The other approach is to blank out raw rain data to isolate that measurement from the long term trends in the sewer. The threshold amount could be zero or a fixed value, or variable depending on the behavior of the site and/or based on historical levels in response to previous/similar rain events. As an example, FIG. 9B shows the data of FIG. 9A modified by filtering during and after rain events, until levels return to a lower, threshold state. Rain events can force transient excursions of water level that are not characteristic of the long term trends in the sewer. It is assumed that, in some cases, a higher quality of decisions can be made by ignoring the transient events and replacing that data with either zero values, or by the mean value within a processing window.

It should be noted that while the above description is presented expressly in the context of a combined sewer system, other systems where a combination of materials with an overflow section may benefit from the system described herein. Therefore, these embodiments may be applied (with appropriate modifications) to enclosures, channels that require some measure of flow/volume overflow determination. Accordingly, it is understood that various modifications and changes may be made to the systems and methods described above to render them applicable to other fields, without departing from the spirit and scope of this disclosure.

It is noted that the functional blocks, methods, devices and systems described in the present disclosure may be integrated or divided into different combinations of systems, devices, and functional blocks, as would be known to those skilled in the art. In general, it should be understood that the hardware described herein could use integrated circuit development technologies, or via some other methods, or the combination of hardware and software objects could be ordered, parameterized, and connected in a software environment to implement different functions described herein. For example, algorithm-based features of the present application may be implemented using a general purpose or dedicated processor running a software application through volatile or non-volatile memory constituting non-transitory signals. Also, the hardware objects could communicate using non-transitory electrical signals, with states of the signals representing different data.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

What is claimed is:

1. A combined overflow structure (COS) detection system, comprising:
   an overflow structure containing a non-overflow side, a weir, and an overflow side;
   a first fluid level sensor positioned over the non-overflow side of the overflow structure to determine a fluid level of the non-overflow side;
   a second fluid level sensor positioned above a top of the weir of the overflow structure to determine a fluid level over the top of the weir;
   sensor supporting electronics above the overflow structure coupled to the first and second fluid level sensors;
   a wireless transmitter coupled to the sensor supporting electronics; and
   an antenna coupled to the wireless transmitter,
   wherein data from the fluid level sensors is wirelessly transmitted to a central data processing system, and the sensor data is used to establish a start and end time of an overflow event and to determine a volume of fluid discharged over the weir.

2. The detection system of claim 1, further comprising a third fluid level sensor over the overflow structure positioned to determine a fluid level of the overflow side and coupled to the sensor supporting electronics.

3. The detection system of claim 1, wherein the overflow structure is in a sewer system.

4. The detection system of claim 3, wherein the overflow structure is in a manhole.

5. The detection system of claim 1, wherein one or more of the fluid level sensors are either ultrasonic, radar, capacitive, optical, standoff water level, immersed water level, weir trigger level, contact, float, moisture, conductivity sensor, magnetic, or micro-electro-mechanical (MEM).

6. The detection system of claim 1, where the second fluid level sensor is affixed to the top of the weir and comprises a plurality of weir sensor structures disposed across the top of the weir, the plurality of weir sensor structures providing at least one of level and flow data, and mitigating against data inaccuracy from an individual weir sensor fouling in the weir sensor structures.

7. The detection system of claim 6, wherein at least one structure of the plurality of weir sensor structures is in an inverted U-shape and contains a liquid or conductive sensor therein.

8. The detection system of claim 6, wherein at least one structure of the plurality of weir sensor structures contains a MEM sensor with a movable float.

9. The detection system of claim 8, within the MEM sensor is attached to the at least one structure of the plurality of weir sensor structures via a swivel or rotating connector.

10. The detection system of claim 1, wherein the central data processing system determines fluid level trending information.

11. The detection system of claim 10, where the fluid level trending information is determinative of an obstruction in the overflow structure.

12. The detection system of claim 10, further comprising a rain mask over the fluid level trending information to remove rain effects.

13. The detection system of claim 1, further comprising one or more environmental sensors external to an enclosure housing the overflow structure, the environmental sensors also forwarding data to the central data processing system.

14. The detection system of claim 1, wherein a sampling rate of the fluid level sensors is variable and altered depending on a level detection threshold or an external trigger.

15. A method for overflow detection in an overflow structure (COS), comprising:
   positioning a first sensor over a non-overflow side of an overflow structure to determine a fluid level of the non-overflow side;
   positioning a second sensor over a top of a weir in the overflow structure to determine a fluid level over the top of the weir;
   coupling sensor supporting electronics above the overflow structure to the first and second sensors;
   coupling a wireless transmitter to the sensor supporting electronics;
   coupling an antenna to the wireless transmitter;
   transmitting the sensor data to a central data processing system; and
   establishing a start and end time of an overflow event and determining a volume of fluid discharged over the weir from data received from the sensors.

16. The method of claim 15, further comprising:
   positioning a third fluid level sensor over the overflow side of the overflow structure to determine a fluid level of the overflow side; and
   coupling the third fluid level sensor to the sensor supporting electronics.

17. The method of claim 15, wherein the overflow structure is in a sewer system.

18. The method of claim 15, further comprising determining fluid level trending information.

19. The method of claim 18, further comprising at least one of determining if there is an obstruction in the overflow structure and removing rain effects from the trending information.

20. A combined overflow structure (COS) detection system, comprising:
   an overflow structure with an non-overflow side, a weir and overflow side;
   first means for determining a fluid level, positioned over the non-overflow side of the overflow structure to determine a fluid level of the non-overflow side;
   second means for determining a fluid level, positioned over a top of a weir in the overflow structure;
   supporting electronics above the overflow structure and coupled to the first and second means;
   wireless transmitting means coupled to supporting electronics;
   a central data processing system receiving data from the wireless transmitting means;
   from the received data, detecting an overflow event and determining a start and end time of the overflow event and determining a volume of fluid discharged over the weir.

* * * * *

UNITED STATES PATENT AND TRADEMARK OFFICE
CERTIFICATE OF CORRECTION

| | | |
|---|---|---|
| PATENT NO. | : 10,612,228 B2 | Page 1 of 1 |
| APPLICATION NO. | : 15/716751 | |
| DATED | : April 7, 2020 | |
| INVENTOR(S) | : Quist et al. | |

It is certified that error appears in the above-identified patent and that said Letters Patent is hereby corrected as shown below:

On the Title Page

Delete the following:
"(73) Assignee: HARDONEX, INC., Escondido, CA (US)"
And replace with:
(73) Assignee: HADRONEX, INC., Escondido, CA (US)

Signed and Sealed this
First Day of March, 2022

Drew Hirshfeld
*Performing the Functions and Duties of the*
*Under Secretary of Commerce for Intellectual Property and*
*Director of the United States Patent and Trademark Office*